United States Patent [19]

Demko

[11] Patent Number: 4,513,686
[45] Date of Patent: Apr. 30, 1985

[54] PIGEON CAGE ASSEMBLY

[76] Inventor: David J. Demko, R.D. 3 Box 232, Reading, Pa. 19606

[21] Appl. No.: 530,392

[22] Filed: Sep. 8, 1983

[51] Int. Cl.³ ............................................. A01K 31/02
[52] U.S. Cl. .................................................. 119/15.6
[58] Field of Search .................... 119/15, 15.6, 21, 23; 49/379, 450

[56] References Cited
U.S. PATENT DOCUMENTS

| 693,901 | 2/1902 | Portman | 119/15.6 |
| 2,733,427 | 1/1956 | Chandler | 49/379 |
| 3,066,647 | 12/1962 | Moller | 119/15.6 |

Primary Examiner—Hugh R. Chamblee
Attorney, Agent, or Firm—William J. Ruano

[57] ABSTRACT

A fully automatic pigeon basket, crate, or cage assembly comprising vertically stacked stalls arranged in several vertical rows, having several vertically slidable doors covering all of said stalls (one sliding door per vertical column of stalls) and opened by gravity. Each portion of the sliding front door covering a stall is provided with an internally extending stop which is firmly attached to the inner side of the door. An electromagnetic solenoid positioned at the bottom of each vertical column of stalls, having an armature or piston against which the stop rests when the solenoid is deenergized, controls the drop of the door. Upon a fraction of a second energization of each individual solenoid, the armature is withdrawn from its supporting position of the stop, then immediately pushed back out to the extended stop position by a spring, thereby allowing just one stop to drop down with the sliding door by gravity to the next higher stop positioned on the door at which time the downward movement of the stop is arrested, allowing full opening of the upper door portion of the upper stall.

A fully automatic electrical system controls the various solenoids to provide a timed interval between the opening of one stall and a lower stall so that the pigeons are released, one at a time, at timed intervals. In some cases, two or more stalls may be opened at the same time after a timed interval.

9 Claims, 11 Drawing Figures

PIGEON CAGE ASSEMBLY

This invention relates to a pigeon basket, cage, or crate for racing pigeons or other purposes and, more particularly, to a so-called "single toss" basket, cage, or crate assembly for providing fully automatic timed intervals for opening of the doors of each.

In the past, racing pigeon crates were provided with a door that was pivoted on the sides or bottom and swung outwardly to liberate the homing pigeons from the crates in large groups. Some doors that were pivoted across the bottom were provided with springs to spring open the door.

An outstanding disadvantage of such a door is that the door must be opened manually, requiring a human to activate the opening of the door.

Another disadvantage is that the door of conventional training baskets allow all of the birds in the crate to exit together instead of one at a time, since no provision was made for liberating one pigeon at a time. Thus, most of the group follow a few lead birds instead of navigating the course home by their own abilities.

Also, in the past, some have placed a single bird in a very small crate having a manually activated electrical latch. The latch was used for releasing a door which pivoted across the bottom and utilized springs to spring open the door once the electrical latch was activated.

An outstanding disadvantage of this is that each small crate required a separate door and a separate solenoid to release the latch to open the door.

Another disadvantage is that the electrical latch still required a human to activate it.

Another disadvantage is the small door of the above crate required a spring loaded hinge and release latch which must work in conjunction with the solenoid, the combination of which is relatively complicated and expensive and sometimes the spring pivots do not operate well, particularly under high winds, whereupon the doors sometimes are stuck even after being unlatched open.

Another disadvantage is that a separate crate is required for each bird. For example, fifteen birds would require fifteen separate, small crates, making transportation difficult since each small crate must be handled separately.

An object of the present invention is to provide a fully automatic single toss pigeon basket, crate, or cage assembly which overcomes the above named disadvantages.

A more specific object of the present invention is to provide a fully automatic pigeon basket, crate, or cage assembly for racing pigeons, for example, wherein doors are vertically slid open downwardly by gravity at timed intervals to allow the racing pigeons to be released singly (or doubly triply, etc.) at timed intervals, instead of in large groups.

Another object is to provide a fully automatic basket, crate, or cage assembly which is relatively simple and inexpensive in overall construction, easy to handle and transport, and highly reliable in operation, even under strong wind conditions.

Another object is to provide a fully automatic pigeon basket, crate, or cage assembly whereby once the birds are placed into the mechanized crate and the release mechanism is started, it is fully automatic and requires no human attendance to release the birds.

Other objects and advantages of the invention will become more apparent from the following description taken with the accompanying drawings wherein.

Referring more particularly to the drawings, numeral 1 denotes a cage assembly containing a plurality of vertical rows of stalls under a common roof, each stall for housing a single pigeon or other bird.

Figure 1:
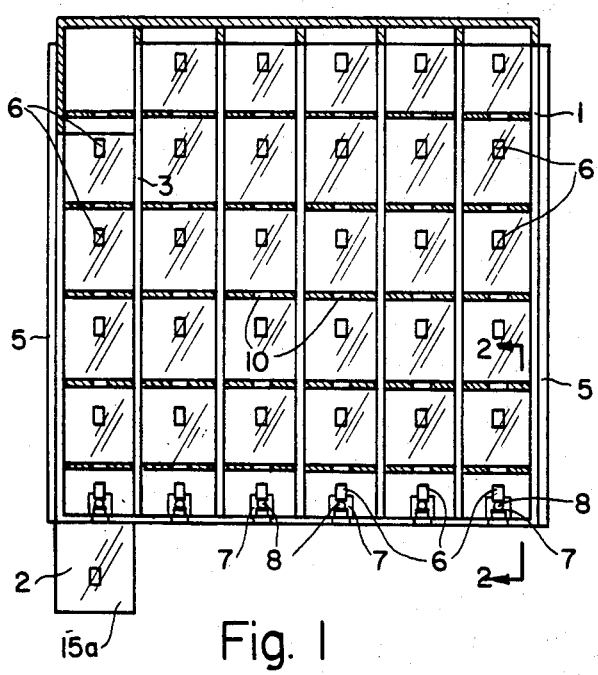
FIG. 1 is a front view of a fully automatic pigeon basket, crate, or cage assembly embodying the present invention.
Figure 2:
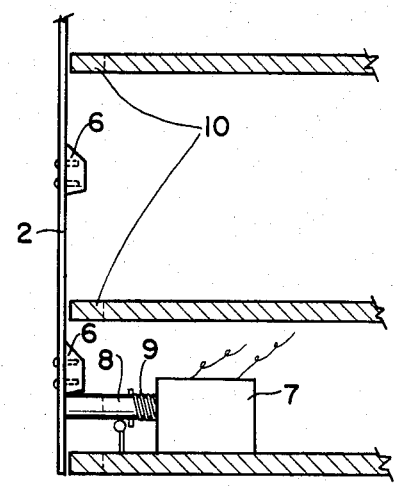
FIG. 2 is a fragmentary, enlarged cross-sectional view taken along line 2—2 of FIG. 1 showing one of the solenoids or electromagnet and stop combinations contained in the bottom stall of each vertical row.
Figure 4:
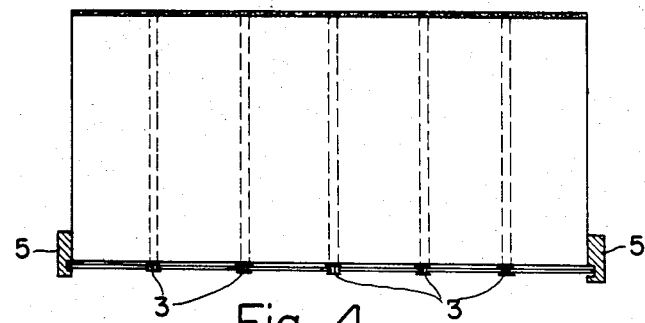
FIG. 4 is a top view of the stall assembly.
Figure 5:
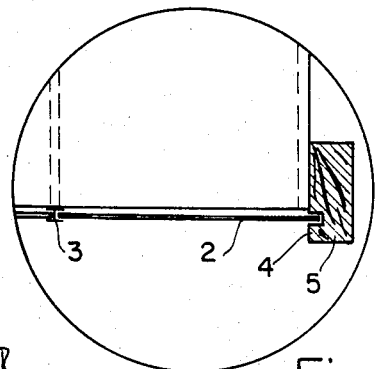
FIG. 5 is an enlarged fragmentary view of a front corner portion of FIG. 4 more clearly illustrating the sliding assembly of the front doors.

At the front of the stall assembly, there are provided several elongated vertically sliding doors 2, one sliding door for each vertical column of stalls one door portion closing each of the stalls stacked vertically. As shown more clearly in FIGS. 4 and 5, each door 2 of a vertical row of stalls is vertically slid between door tracks 3 extending vertically,—the end doors being also slid, at the other side, in a notch 4 formed in a side vertical column or support 5 of the assembly which may be a ¾ inch by 2-inch plywood strip. The doors 2 may be of "Plexiglas" or any other suitable material, either transparent, translucent or opaque. Fastened to and projecting inwardly of the doors 2, are a plurality of stops, such as 6,—one for each stall. The vertical distance between each of the door stops 6 is equal to the vertical height of one stall. As shown in FIGS. 1 and 2, notches 10 cut into the floors, allow the stops to pass by the floors without hitting the floors as they make their intermittent vertically downward descent.

As shown more clearly in FIG. 2, the bottom stall of each vertical row has an electromagnetic solenoid 7 containing an armature or piston 8 and return springs 9 for normally urging the solenoid armature or piston 8 against the inner surface of the door 2 so as to serve as a stop against which the door stop 6 will rest. Armature 8 is withdrawn for a fraction of a second to dotted line position shown in FIG. 2 when the solenoid is energized for a fraction of a second, allowing first one stop to drop down past the end of the armature 8. All of the door stops 6, as shown in FIG. 2. have a beveled top edge allowing the armature 8 to glide over the stop 6 as the operator manually pushes each of the vertically sliding doors 2 back up to their fully closed position.

By well known electronic control means (not shown), electronic controls operate the various electromagnetic solenoids 7, a single solenoid at a time, by providing a timed pulse of electricity to a solenoid 7 that is just a fraction of a second in duration and therefore withdrawing the solenoid armature 8 for only a fraction of a second, just long enough for one stop 6 on the sliding door 2 to drop past the end of the solenoid armature 8. Spring 9 immediately urges the solenoid armature 8 back out to the stop position as shoon as the stop passes it allowing the sliding doors 2 to slide vertically downwardly along tracks 3 and 5 until the stop 6 of the next lower stall contacts the armature or piston 8 at which time the downward sliding movement of door 2 is arrested.

The electronic control means also provide a time interval between solenoid energizations, producing a sequential drop to any given vertically sliding door 2 as it allows the opening or exposing of one stall at a time with a time interval between each opening or exposing of each stall.

In operation, as stated above, the various solenoids 7, beginning with the left most solenoid of the vertical rows, are sequentially energized at uniform timed intervals so that the left-most door 2 will be intermittently allowed to slide downwardly, only by the vertical length or height of one stall as stated above. This drop of only one stall at each solenoid energization is accomplished by having the solenoid energization last only a fraction of a second, just long enough to let just one door drop past the end of the armature 8. The spring 9 immediately urges the armature back out to the stop position as soon as one stop passes the end of the armature. The door is arrested as the next higher stop drops down to hit the solenoid armature. When the bottom stall of a vertical column is opened, the electronic controls automatically start the next door to the right into its sequential drop. In this manner, the stalls in any vertical column will be sequentially opened from top to bottom to liberate the pigeons singly at timed intervals. The length of time between solenoid energizations can be manually adjusted by the operator before the machine is started. A time interval between 0 and 10 minutes is most commonly used.

In some cases, it is desired to have perhaps two or three or more stalls opened simultaneously at timed intervals; for example, the horizontally disposed stalls. This can be done by simply changing the control means so as to energize two or three or more of horizontally arranged solenoids at a time until all stalls in the vertical rows are opened sequentially.

Thus, instead of a single sliding door descending in its sequential drop from top to bottom, two or three or more doors may be made to descend simultaneously. As stated above, when the bottom stall of a vertical column is opened, the electronic controls automatically start the adjacent door to the right in to its sequential drop. It becomes obvious visualizing a simultaneous intermittent drop of two doors on FIG. 1. The first door (far left door) and the fourth door drop together, then the second and fifth doors drop together, then the third and sixth doors drop together. In the drop of three doors simultaneously, the first, third and fifth doors drop together, then the second, fourth and sixth doors drop together. When the last bird or birds are liberated by the machine, the device automatically shuts itself off.

Figure 7:
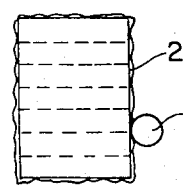
FIG. 7 shows a modification of the door as being a continuous loop.

In operation the cage is elevated three to four feet above the ground, allowing the doors to slide downwardly uninterupted. It will readily appear that each door 2, by the time the lowermost stall is opened, will extend a substantial length below the floor of such lowermost stall. It it is desired to avoid such abnormal projection, the door 2 may be made sufficiently flexible by being made of thin flexible plastic strip material 2a arranged continuously in a loop form, as shown in side view FIG. 7, wherein loop 2a is looped completely around the assembly and may be driven by any suitable motor driven power source 8 to take the place of the gravity pull on the door. The loop will have an elongated opening, the length of one vertical row of stalls. The driving power may be only sufficient to move the loop 2a when it is not held back by any one or more armatures 8 of a solenoid.

Figure 6:
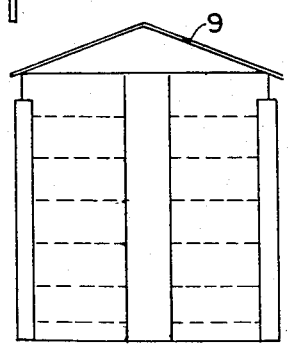
FIG. 6 is an elevational view showing two stacked baskets, crates, or cages under a common roof in spaced back-to-back relationship.

FIG. 6 shows an arrangement whereby two stacks of stalls, that is, two separate stall units as shown in FIGS. 1 to 4 are arranged in spaced back-to-back relationship. FIG. 6 shows how both stalls share a common roof 9 to provide cover and insulation for the upper as well as lower stalls. A single unit of stalls is also fitted with some type of simple roof. The rear wall or panel closing off the back of the stalls is preferably ventilated by providing openings therein.

Figure 3:
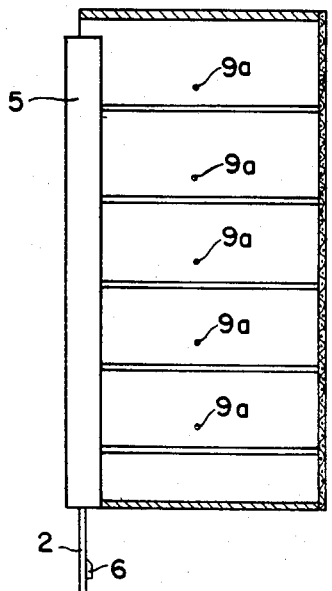
FIG. 3 is an elevational view as viewed from the right of FIG. 1.

Since it is the bird's nature to back up toward the rear of the stall when being placed in a stall of the machine, it is preferred to provide each stall of the cage assembly with a rod 9a (FIG. 3). This may be done by drilling confronting holes through the vertical partitions at each level of stalls and then extending, through the holes, horizontally a solid one-quarter inch round, wooden dowel rod 9a, one for each level of stalls. The rod is preferably about 1⅜-inch height from the floor of each stall and spaced sufficiently from the rear stationary wall, which is preferably screened or ventilated, so that the pigeons flight feathers and tail will not hit the screened or ventilated rear wall which would fray the end of their flight feathers. Since a racing pigeon must race an average of 1,500 to 2,000 miles every season, it is critical that the ends of the flight feathers be kept undamaged, since they supply the power of flight.

Naturally, for proper exiting of the cage assembly, the racing pigeon must remain faced in the direction of the sliding door, therefore the width and height of each stall is just large enough for a pigeon to fit into, but small enough so that it cannot turn around. The depth of the stalls is approximately 12 inches. In some cases, the stalls may be elongated so two or three pigeons can be placed in a single stall, one behind the other. The dowel 9a is spaced high enough so it hits the top of the bird's leg so that it connot step over it to back up. The dowel may also be placed about three inches above the floor instead of 1⅜-inch so it is over the bird's back. This, likewise, prevents the bird from backing up in the stall. The dowel rods may be slid horizontally out out of the way until the birds are loaded into the cage. The dowel rod even avoids the necessity of having a rear wall or screen on the back of the cage, since the bird cannot back out, which makes the cost of manufacture of the cage considerably less and provides even greater ventilation. The roof will keep the rain and snow from entering the cage, either from the front or rear. Of course, the front slidable doors may be perforated or screened for ventilating purposes, if desired. If a screened back is used on the cage assembly, the operator places the birds (with the bird's head facing the door) into the stalls from the front of the cage assembly starting from the bottom of a vertical row and continuing sequentially toward the top. As each bird is placed into its stall, the operator manually pushes the vertically sliding door up to cover that stall, thus closing the bird into that stall. If a screened back is not used, it is easiest to first completely close all of the sliding doors and thereby closing off all of the stalls, then slide all the dowel rods 9a out of the cage assembly, then load each bird from the rear of the cage assembly, sliding the dowel rod 9a horizontally back through the confronting hole in the vertical partitions of the cage assembly and behind the bird's leg as each bird is loaded. After all the birds are loaded, the cage assembly electronic control means are manually set to open 1, 2, 3, etc. doors at a time. The cage assembly is then manually turned on and from that point, needs no human attendance or supervision to release the birds singly, doubly, triply, etc.

Thus it will be seen that I have provided an efficient, fully automatic "single toss" basket, crate, cage, or machine assembly for liberating pigeons and saving the owner great amounts of training time since it eliminates the owner's task of liberating the pigeons singly, by hand, and for other purposes, which is of relatively simple and inexpensive construction and also weatherproof, and easy to transport and handle since all the stalls for holding the birds are interconnected as a single unit and wherein a plurality of sliding front doors are progressively opned intermittently, at timed intervals, to allow a sequential opening of stalls under a common roof in a vertical row so that pigeons therein may escape or be liberated, one at a time, at timed intervals,—or whereby two or more pigeons may be liberated at timed intervals, by sequential opening of two or more stalls simultaneously under a common roof in two or more vertical rows so that pigeons therein may escape or be liberated at timed intervals,—or whereby one, two or more pigeons may be liberated at timed intervals when a continous loop flexible door allows progressive openings of the stalls, intermittently at timed intervals.

Figure 8:
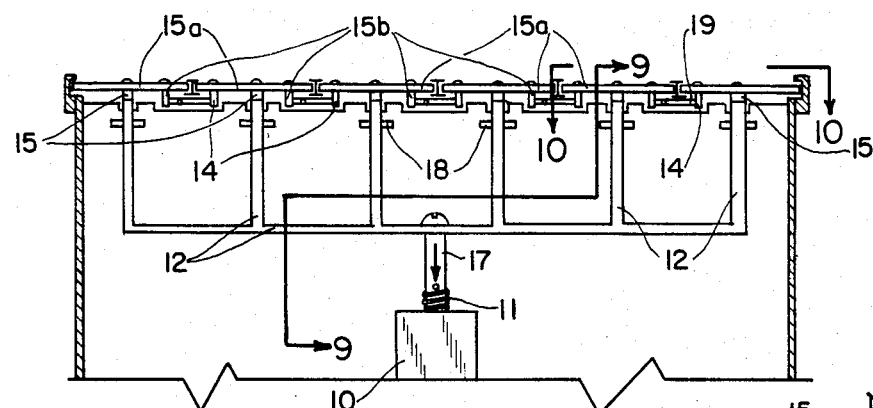
FIG. 8 is a top view of the bottom level or utility compartment, showing a modification using only a single solenoid for operating all the slidable doors of the cage.
Figure 9:
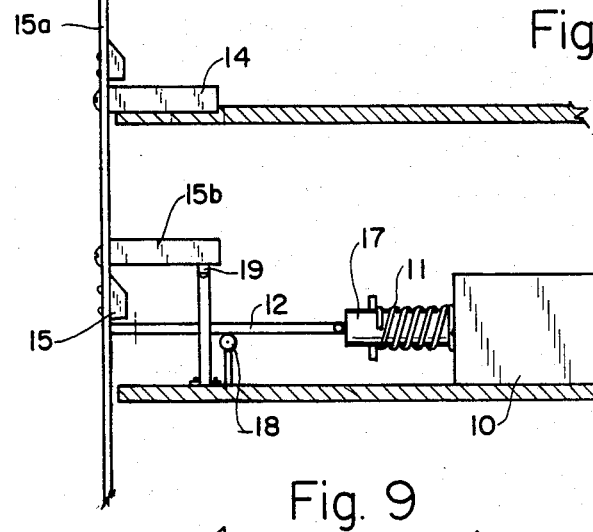
FIG. 9 is an enlarged cross-sectional view taken along line 9—9 of FIG. 8.
Figure 10:
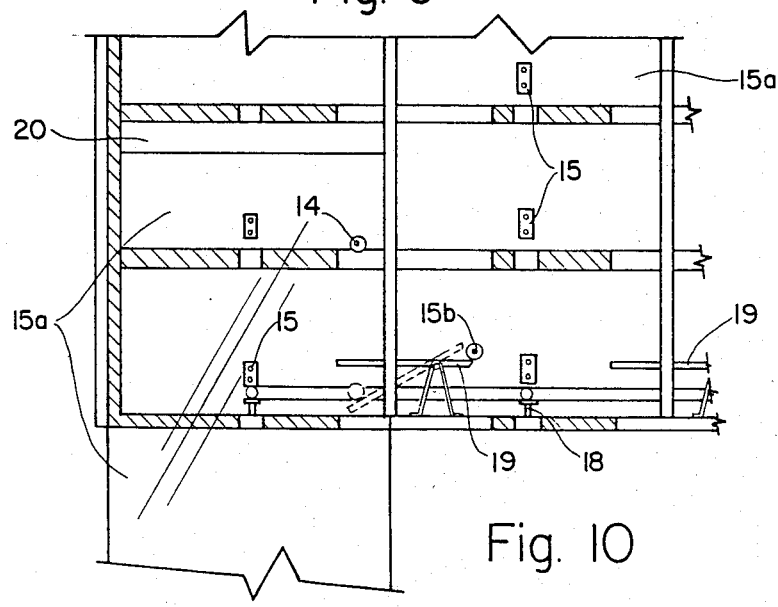
FIG. 10 is a cross-sectional view taken along line 10—10 of FIG. 8.

FIGS. 8, 9, and 10 show a modification of the invention wherein instead of using one electromagnetic solenoid to control the drop for each of the sliding doors, only one solenoid is used to control the drop of all the sliding doors. This considerably reduces the cost of manufacture.

Referring particularly to the above mentioned modification, FIG. 8 shows the bottom level or utility compartment. The electromagnetic solenoid 10 has a spring 11 that urges armature 17 and rigid linkage 12 normally outwardly toward the sliding doors. When the solenoid is energized for a fraction of a second, it retracts the piston or armature 17 with entire rigid linkage 12 to the dotted line position shown in FIG. 9.

The rigid linkage 12 is composed of steel, aluminum, plastic, or some other type of rigid material that will not bend when the solenoid pulls on it. The armature ends of the rigid linkage one armature end for each sliding door, support the door stops 15 as the door is dropping. The shape of the rigid linkage is best shown in FIG. 8.

Each sliding door 15a has one locking pin release stop 14 rigidly secured near the top of each door. Likewise, as in FIG. 1, the modification has a plurality of vertically spaced door stops 15 rigidly secured to the armature doors and which are adapted to rest upon the ends of the one piece rigid linkage 12 which is secured to the armature or piston 17 of the solenoid. The rigid linkage 12 is supported by a support roller 18 (most clearly shown in FIG. 9) or by any other type of frictionless support mounted on the bottom floor of the cage assembly or crate. Also on the bottom floor of the cage assembly or at some other convenient location, there are securely mounted several oneway pivoting locking pins 19, one for each door except the last first door since the first door always starts the opening sequence and, whose operation is best shown in FIG. 10 locks in the horizontal position turning clockwise. Locking pin, 19; therefore, when it is in the horizontal position, as shown in full lines, the sliding door support stop 15b, of the adjacent vertically sliding door which is firmly secured to the plexiglas door, rests on it and thereby supports the door in a predetermined position.

FIG. 9 shows a side view taken along 9—9 of FIG. 8. When facing the front or door side of the cage, numeral 14 of FIGS. 9 and 10 shows the locking pin release stop of the far left side door, while numeral 15b is the sliding door support stop of the first door to the right and adjacent to of the far left side door. The relative positions of both numerals 14 and 15b of FIG. 9 are more clearly shown on FIG. 10.

Upon energization of the solenoid, for a fraction of a second armature 17 and the entire rigid linkage 12 are retracted which allows the door stops 15 to drop past the armature end of the rigid linkage, thus allowing the sliding door to drop only the vertical length or height of one stall. This drop of only one stall at each solenoid energization is accomplished by having the solenoid energization last only a fraction of a second, just long enough to leg just one door stop 15 drop past the end of the rigid linkage 12. The spring 11 immediately urges the armature with the rigid linkage back out to the stop position as soon as one stop passes the end of the rigid linkage. This door is then arrested as the next higher stop drops down to hit the end of the rigid linkage. All the sliding doors would slide down by gravity since all the supporting armature ends (one for each sliding door) of the rigid linkage are pulled in when the solenoid is energized, but the one-way pivot locking pins 19, most clearly shown in FIG. 10, temorarily support the doors to the right of the door in operation. As shown in FIG. 10, the one-way pivot locking pin 19 in the horizontal or locking position supports the door on the right from sliding down when the solenoid is energized. As shown most clearly in FIGS. 9 and 10, the bottom door stop 15 of the door to the right is not resting on the armature end of the rigid linkage since the one-way pivot locking pin 19 is temporarily supporting the door and door. Therefore the stop can not drop down, even though the rigid linkage is pulled in with each solenoid energization, until the first door on the left opens its bottom stall and simultaneously the locking pin release stop 14 strikes the locking pin 19.

FIG. 10 shows that the sliding door 15a on the left has already slid down opening the stalls #1, #2, #3, and #4 above, one at a time. At the next solenoid energization, the far left door will slide down to open the #5 stall, which is the last stall in that vertical row containing a bird, since the bottom compartment houses the mechanical and electrical parts. As the rigid linkage is pulled in by the solenoid and allows the far left door to drop, the force of the locking pin release stop 14 striking the one-way pivot locking pin 19 forces the one-way pivot locking pin into the lifted position shown by the dotted lines, releasing the temporary support provided by the one-way pivot locking pin. The door to the right is then free to drop by gravity as the solenoid retracts the rigid linkage with each energization. As the second door opens its bottom stall, its solinoid locking pin release stop 14 simultaneously strikes the locking pin 19 for the third door. This process continues until all the doors have been opened. More than one door can be allowed to fall at one time by simply not engaging the one-way pivot locking pins for those doors. That is, if one wishes for more than one door to fall at a time, he simply manually disengages the one-way pivot locking pin 19 for those doors before the machine is started. Therefore, no alterations of the electronic controls are necessary to permit 2, 3, 4, 5, etc. doors to open at one time, which means the manufacture cost of the electronic controls is reduced since no alterations to the electronic controls are necessary. Door 15a always drops ½-1 inch below the bottom of the floor above so that the bird's toes cannot be caught between the door and the floor of the stall as the bird exits. Thus, when the sliding door is in the closed position for a given stall that is next to be opened, a space 20 is evident between the top of the door and the floor above.

In some situations, instead of a single electro-magnet solenoid as shown in FIG. 8, two may be used side by side for moving the rigid linkage by having their armatures 17 rigidly connected to the rigid linkage 12.

Figure 11:
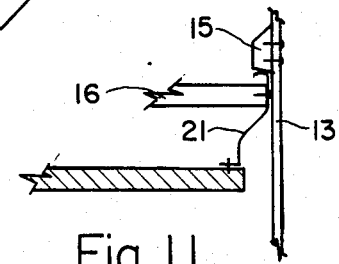
FIG. 11 is a modification of the support for the door stop.

FIG. 11 shows an alternate method of supporting door stops 15 during operation which is to fasten the end of the rigid linkage 16 or solenoid piston 8 (from FIG. 2) to a flat spring which is formed and fastened to press against the sliding door and at the same time, is stiff enough to carry the weight of the door as the door stop 15 rests on it. With this method, spring 11 and roller support 18 (shown in FIGS. 8 and 9) are not needed.

Regarding the one-way pivot locking pin, as is explained above and on FIG. 10, it serves as a temporary support. It is the idea of temporarily supporting the door until it is ready to drop in its proper sequence that is an important part of my invention, and not necessarily the mechanical method used to achieve the support. Various other simple mechanical assemblies (not shown) can be used to achieve the same temporary supporting.

Regarding the timed intervals between solenoid energizations as mentioned earlier, the time interval between solenoid energizations can be manually adjusted by the operator before the machine is started. For example, with a tail wind the pigeons may normally start for home within one minute after being liberated so a time interval of perhaps two minutes is selected for use on that day and is sufficient for assuring the birds coming home one at a time. However, in a head wind, the birds may take approximately seven minutes to get started home because the wind slows them down a great deal. Therefore, a time interval of perhaps ten minutes may be selected for that day and will be sufficient to assure the birds home separately.

While I have illustrated the machine described as having six vertical rows of five stalls, any number combination of stalls can be built into the machine.

Also, the machine can be operated by either AC or DC electrical current. With either AC or DC current, the machine shuts itself off automatically when the last stall is opened to allow the last bird in the machine to exit.

While I have illustrated and described several embodiments of my invention, it will be understood that these are by way of illustration only and that various changes and modifications may be contemplated in my invention and within the scope of the following claims:

I claim:
1. A fully automatic cage assembly for pigeons and the like, comprising a plurality of stalls in stacked relationship arranged in a plurality of vertical rows, a unitary front door panel means slidably mounted vertically, one of said door panel means for each of said vertical rows for covering said plurality of stalls in a vertical row, a back for covering the rear of said cage assembly, a plurality of stops, one for each stall, fastened securely to said front door panel means, extending inwardly from said front door panel means, and electrically controlled arresting means at the bottom of each vertical column of stalls, operated at timed intervals so that said door panel means will be intermittently lowered to expose at least one stall at a time in a said vertical row, at timed intervals, said arresting means being in the form of an electro-magnetic solenoid at the bottom of each vertical column of stalls, each having an armature which normally extends outwardly in the path of the stops projecting in the stalls, and whereby, when energized, the armature is withdrawn to allow one stop at each solenoid energization to move downwardly past the end of the armature, means which immediately urges the said armature back out to the stop position as soon as the stop drops past the end of the armature, the said strip again being arrested as the next higher stop drops down to hit the solenoid armature a uniform time interval between each solenoid energization creating separate openings of each stall.

2. A fully automatic pigeon cage assembly as recited in claim 1 together with horizontally slidable dowels which eliminate the need for placing wire screen or another closure over the rear of said stall assembly since said dowels prevent the bird from backing out of said stall and at the same time, prevents damage of the bird's flight feathers since there is no wire screen or other rear wall enclosure for the bird's feathers to hit against.

3. A fully automatic pigeon cage assembly as recited in claim 1 wherein all of the said plurality of stalls are interconnected so the floor of one stall forms the roof of the stall below, and the wall of one stall forms the wall of the adjacent stall, all of the said interconnected stalls forming the said cage assembly and being covered by a common roof.

4. An assembly as recited in claim 1 wherein said door panel means is a single strip covering all the stalls of said vertical row, and wherein said last-named means is a spring.

5. An assembly as recited in claim 1, together with electrical control means to allow at least two of said door panel means to descend intermittently together.

6. An assembly as recited in claim 1 together with means for manually adjusting the length of time between solenoid energizations.

7. An assembly as recited in claim 1 together with means responsive to opening of the bottom stall of a given row for initiating descent of an adjacent row into its timed descent.

8. A fully automatic pigeon cage assembly as recited in claim 1 together with a rigid linkage consisting of a plurality of armature ends, one for each of said door panel means, being all firmly interconnected and fastened to one of said electromagnetic solenoids enabling all of said door panel means to drop in their timed interval of descent, eliminating the need of having a solenoid for each of the said door panel means.

9. A fully automatic pigeon cage assembly as recited in claim 1 together with a one-way pivot locking pin for each of said door panel means except for the first of said door panels means, acting as a pivotal means securely mounted in the bottom compartment of said cage assembly, locking at a horizontal position to temporarily support said door panel means above the said armature ends of said rigid linkage and thereby preventing said door panel means from dropping with each of said solenoid energizations until the adjacent said door panel means has completed its sequential descent, and which may be manually engaged or disengaged by the operator, and when used in conjunction with the rigid linkage, serves to simplify said electronic controls by enabling a plurality of said door panel means to start their sequential drop simultaneously without any electrical adjustments.

* * * * *